(12) United States Patent
Lai et al.

(10) Patent No.: US 6,460,092 B1
(45) Date of Patent: Oct. 1, 2002

(54) INTEGRATED CIRCUIT FOR DISTRIBUTED-TYPE INPUT/OUTPUT CONTROL

(75) Inventors: Chen-Kuo Lai, Hsinchu; Wen-Chuan Chen, Tao Yuan; Ying-Min Chen; Chang-Yu Ho, both of Hsinchu, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/320,243

(22) Filed: May 26, 1999

(51) Int. Cl.⁷ .............................. G06F 13/14; G06F 3/00
(52) U.S. Cl. ................... 710/5; 710/1; 714/48
(58) Field of Search ......................... 710/1–3, 48, 50, 710/51, 66, 129, 5; 714/48, 53; 327/199

(56) References Cited

U.S. PATENT DOCUMENTS

| | | | | |
|---|---|---|---|---|
| 4,245,300 A | * | 1/1981 | Kaufman et al. ............... | 710/1 |
| 4,509,113 A | * | 4/1985 | Heath ........................... | 710/66 |
| 5,473,775 A | * | 12/1995 | Sakai et al. ..................... | 713/2 |
| 5,586,253 A | * | 12/1996 | Green et al. ................... | 714/53 |
| 5,661,427 A | * | 8/1997 | McBride et al. ............. | 327/236 |
| 6,038,616 A | * | 3/2000 | Thornton et al. ............... | 710/2 |
| 6,202,108 B1 | * | 3/2001 | Autechaud et al. ........... | 710/61 |
| 6,265,922 B1 | * | 7/2001 | Kirsch ......................... | 327/199 |
| 6,282,674 B1 | * | 8/2001 | Patel et al. .................... | 714/30 |
| 6,321,361 B1 | * | 11/2001 | Autechaud et al. ......... | 714/807 |
| 6,330,668 B1 | * | 12/2001 | Curiger et al. ................. | 713/1 |

* cited by examiner

*Primary Examiner*—Thomas Lee
*Assistant Examiner*—Thuan Du

(57) ABSTRACT

A distributed-type input/output control IC is proposed to provide an integrated type improvement to the conventional remote control system. The distributed-type input/output control IC comprises a plurality of local digital IO and a plurality of remote IO master to control a plurality sets of local and remote systems and to simplify wiring.

6 Claims, 5 Drawing Sheets

INTEGRATED CIRCUIT FOR DISTRIBUTED-TYPE INPUT/OUTPUT CONTROL

FIELD OF THE INVENTION

The present invention relates to an integral-type IC for distributed-type input/output control to provide input/output control for remote end, thus simplifies wiring and maintenance.

BACKGROUND OF THE INVENTION

The application-specific integrated circuit (ASIC) for automatic control system becomes popular due to the rapid development of semiconductor technology. For examples, micro-controller, multiplexer and embedded microprocessor have found wide application.

However, the wiring of the automatic control system is complicated, especially for multi-module. Taking a six-slave module as an example, each set of module has 64 input/output lines. The number of total input and output lines is 128. Therefore, the number of wiring for the six-slave module is 768. The wiring and maintenance of the system is troublesome.

The object of the present invention is to provide an IC that simplifies the I/O control of the wiring.

In one aspect of the invention, the integral-type IC for distributed-type input/output control can control multiple remote and local I/O connection to simplify wiring.

To achieve above and other objects, the IC of the present invention comprises a plurality of local digital IO for controlling the local I/O and remote IO master which perform command from ISA BUS to transmit signal in CRC format to remote end and vice versa.

The various objects and advantages of the present invention will be more readily understood from the following detailed description when read in conjunction with the appended drawings, in which:

DETAILED DESCRIPTION OF THE PREFERRED EMBODIMENTS

The present invention is intended to provide an integral-type IC for distributed-type input/output control which can control multiple remote and local I/O in an integral way, thus simplifies wiring and maintenance.

Figure 1:
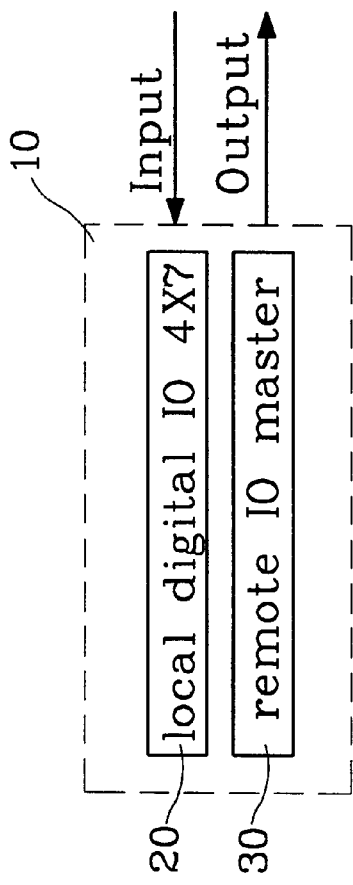
FIG. 1 is the block diagram of the invention

FIG. 1 is the block diagram of the invention. The integral-type IC 10 for distributed-type input/output control is an ASIC and control multiple local systems remotely. It should be stressed that the system can be classified to master mode and slave mode wherein the system shown in FIG. 1 is the slave mode.

The distributed-type input/output control IC 10 comprises a plurality of local digital IO 20 to control local input/output such as a plurality of switches and lamps, and a remote IO master 30 to execute command from a bus and transmit data in CRC format to remote end through a single transmission line and vice versa.

Figure 2:
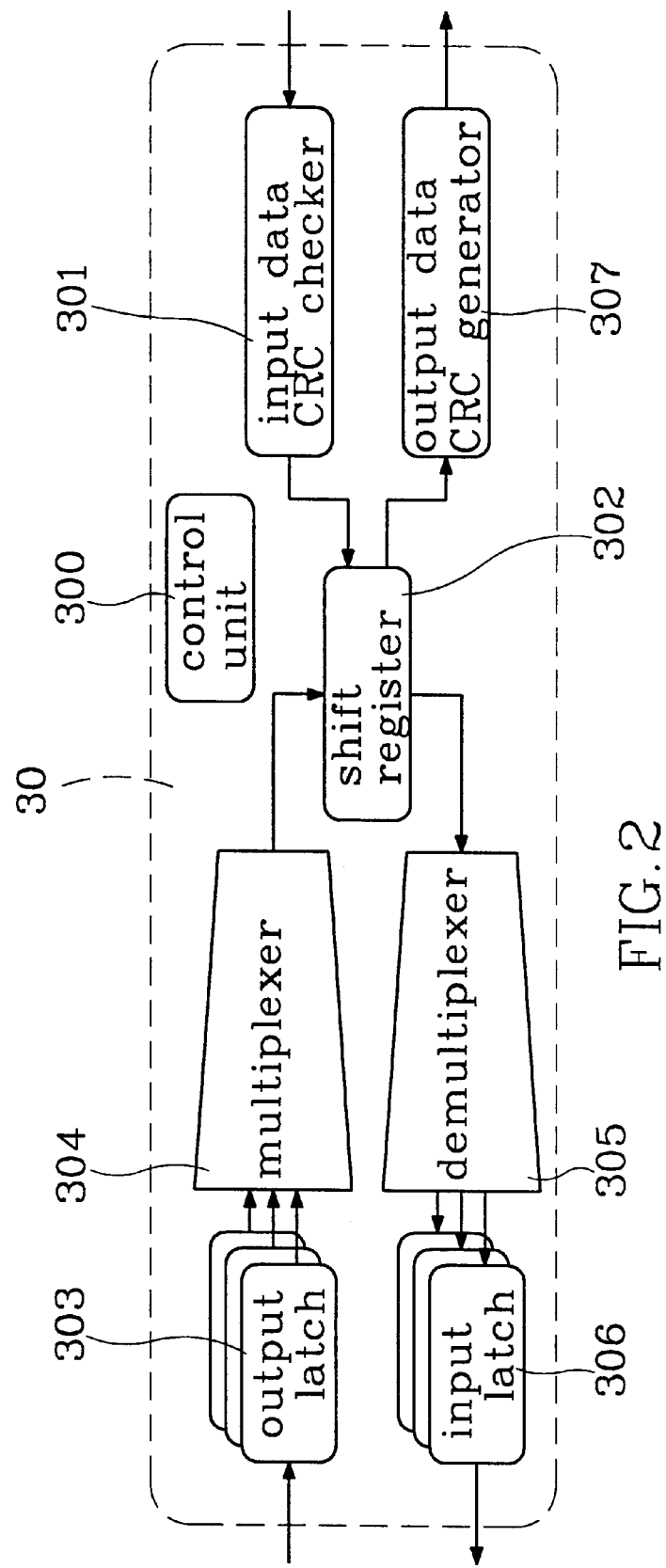
FIG. 2 is the block diagram of the remote IO master.

FIG. 2 is the block diagram of the remote IO master 30, which comprises a control unit 300 to control each functional block in the remote IO master 30, an input data CRC checker 301 for checking the CRC error of the input data, a shift register 302 connected to the input data CRC checker 301 to register the remote data, an output data CRC generator 307 connected to the shift register 302 to generate error detection information for the data output by the remote IO master 30.

The remote IO master 30 also comprises an output latch 303 to latch the plurality of data sent from distributed-type input/output control IC 10 to remote end, a multiplexer 304 connected to the output of the output latch 303 to multiplex three data as one set data and transmit the data to the shift register 302, a de-multiplexer 305 connected to the shift register 302 to de multiplex the data sent to the distributed-type input/output control IC 10 into three set of data, and an input latch 306 to latch the data to be sent to the distributed-type input/output control IC 10.

Figure 3:
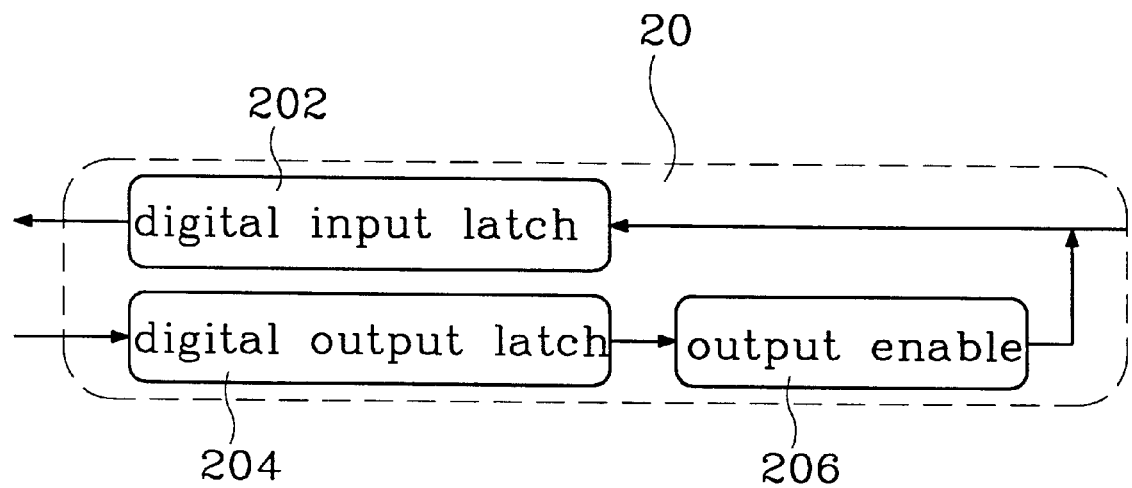
FIG. 3 is the block diagram of the local digital IO.

FIG. 3 is the block diagram of the local digital IO 20 in the distributed-type input/output control IC 10. The local digital IO 20 comprises a digital input latch 202 to latch the data from the connected digital circuit to the distributed-type input/output control IC 10, a digital out latch 204 connected to an output enable 206 to latch the data from the distributed-type input/output control IC 10 to the digital circuit to be connected and control the output enable. In the preferred embodiment of the invention, there are seven sets of local digital IO 20, and each set is connected to four input/output circuits.

Figure 4:
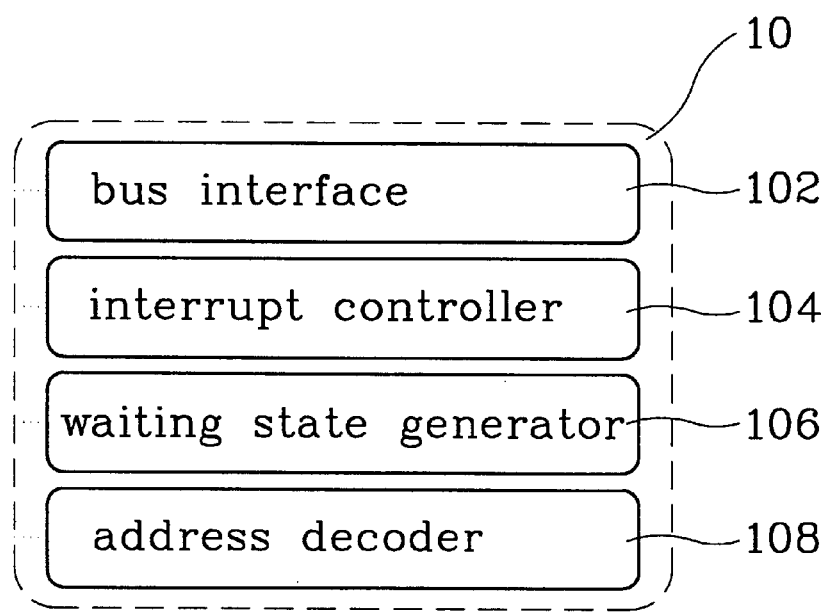
FIG. 4 is the block diagram of the auxiliary circuit in the distributed-type input/output control IC.

FIG. 4 is the block diagram of the auxiliary circuit in the distributed-type input/output control IC. The IC 10 also comprises a bus interface 102 for the interface of data transfer with CPU, an interrupt controller 104 for controlling the interrupt vector of the CPU, a waiting state generator 106 for setting the waiting time of CPU when accessing the IC 10, and an address decoder 108 for dealing the address decoding process between the CPU and the IC 10.

Figure 5:
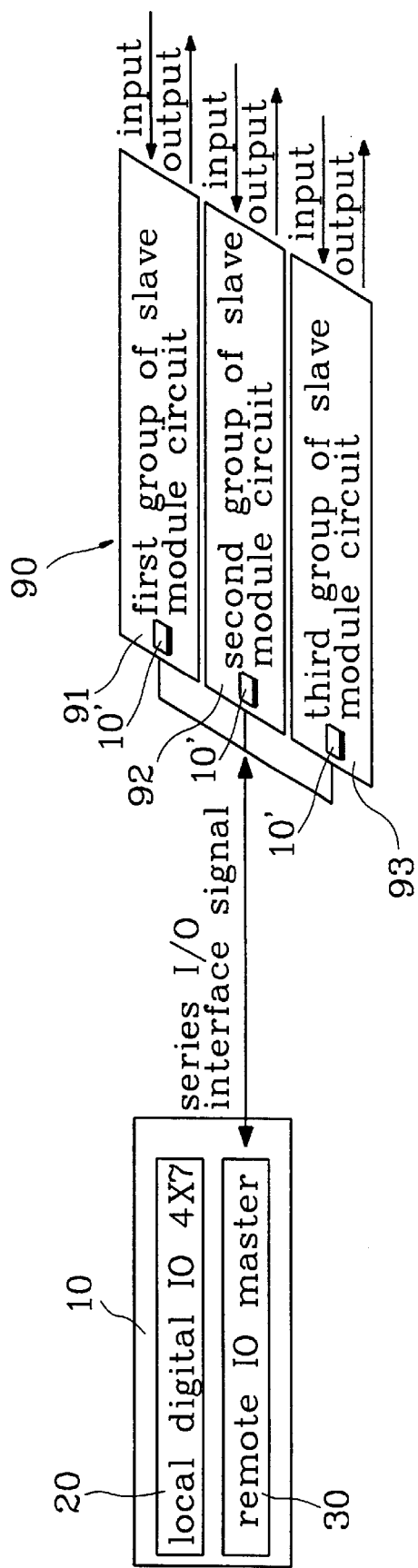
FIG. 5 is the block diagram of the slave IO mode.

The present invention can be adopted to be remote IO master or to be salve IO mode. FIG. 5 is the block diagram of the slave IO mode, wherein numeral 10 denotes the master mode IC and is the distributed-type input/output control IC in FIG. 1, and 10' denotes the slave mode distributed-type input/output control IC. Both the IC 10 and 10' are of the same IC but with different internal circuits for different operation mode. The master mode distributed-type input/output control IC 10 is connected to a plurality of control circuits (i.e. digital input/output circuit) and the adopts serial IO interface as protocol therebetween.

As shown in FIG. 5, the set of slave IO module and interfacing circuit 90 comprises the first group of slave module circuit 91, the second group of slave module circuit 92, and the third group of slave module circuit 93. Each group of slave module circuit 91, 92 or 93 comprises a slave mode distributed-type input/output control IC 10'. The salve IO module and interfacing circuit 90 and the master mode distributed-type input/output control IC 10 are connected through serial IO interface and there are six signal lines in this embodiment.

It should be noted the master mode IC and the salve mode IC shown in FIG. 5 should be matched to each other to send data to remote end.

In above-mentioned embodiment, the slave module circuit 91, 92 or 93 is connected to external I/O unit through 64×2=128 I/O ports while each slave module circuit is connected to the master mode distributed-type input/output control IC 10 through only 4 signal lines. In other word, the wiring can be reduced from 128 to 4 by the present invention.

Figure 6:
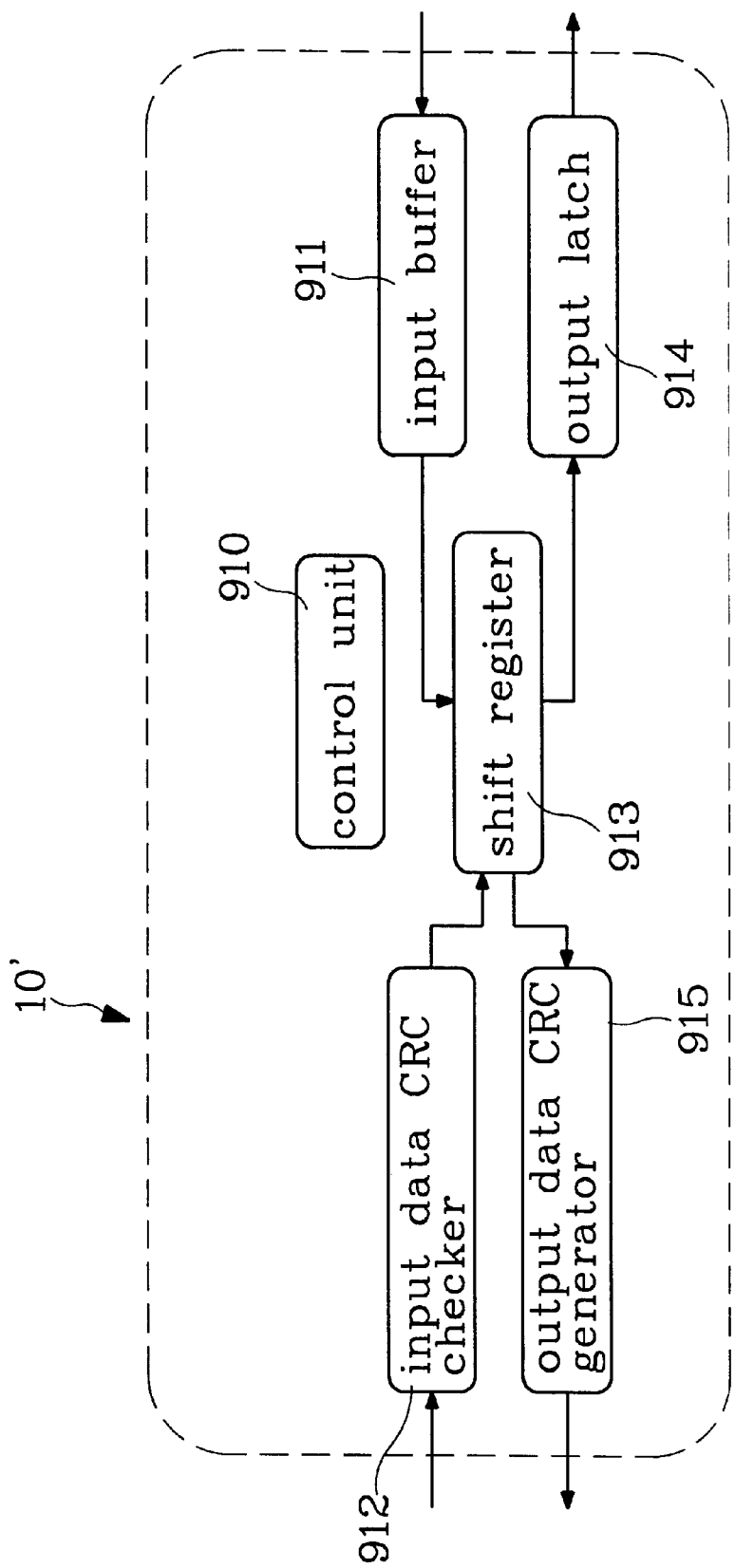
FIG. 6 is the circuit diagram of the slave module.

FIG. 6 is the circuit diagram of the slave mode distributed-type input/output control IC 10'. As shown in FIG. 6, the IC 10' comprises a control unit 910 to control other members of the distributed-type input/output control IC in slave mode, an input buffer 911 to buff the data to be sent to the slave mode distributed-type input/output control IC 10', a shift register 913 connected to the input buffer 911 for registering data, and an input data CRC checker 912 connected to the shift register 913 to check the CRC error for the input data.

Moreover, the slave mode distributed-type input/output control IC 10' further comprises an output latch 914 to latch the output data of the slave mode distributed-type input/output control IC 10', and an output data CRC generator 915 to generate error detection information for the data output by the slave mode distributed-type input/output control IC 10.

Figure 7:
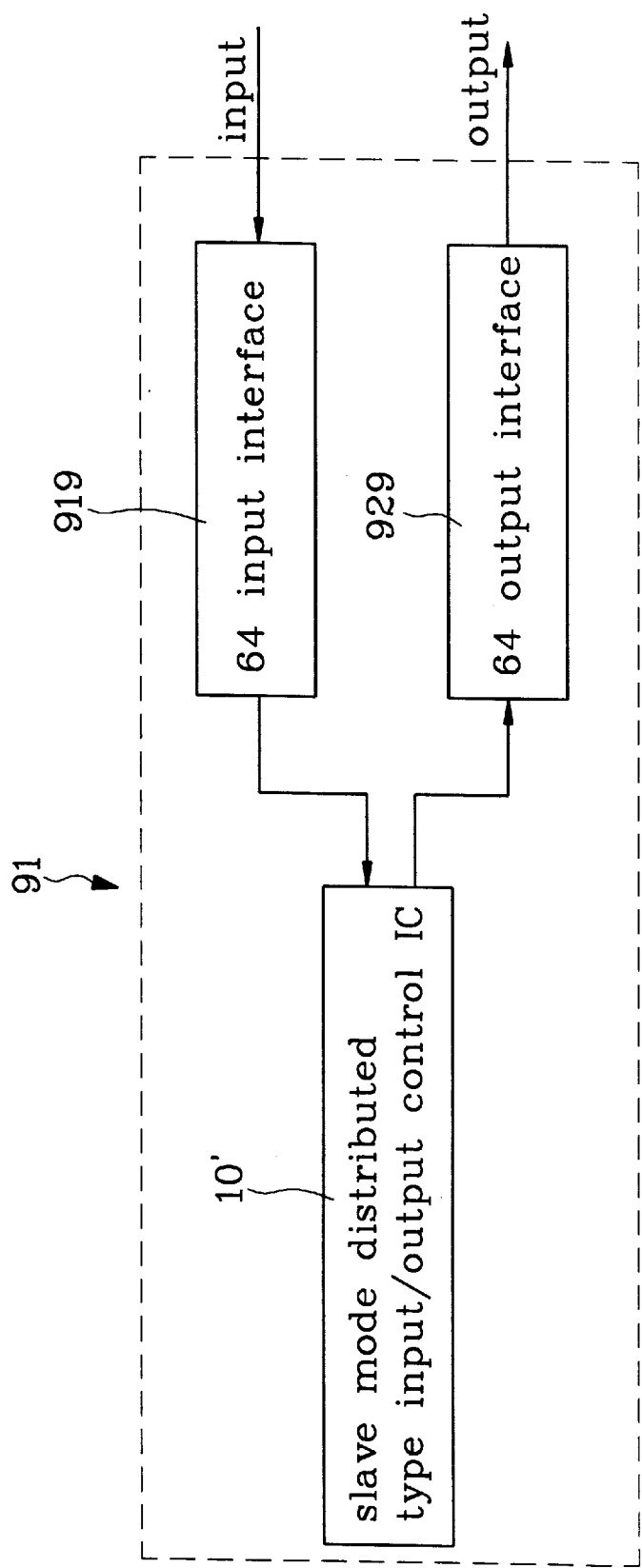
FIG. 7 is the circuit diagram of the first group of slave module circuit.

FIG. 7 is the circuit diagram of the first group of slave module circuit 91 while other lave module circuits 92 and 93 have the same circuits. The first group of slave module circuit 91 comprises a slave mode distributed-type input/output control IC 10' for digital IO control, a 64 input interface 919 to receive external input and a 64 output interface 92 to transmit a output signal t the connected switch or lamp.

To sum up, the inventive integral-type IC for distributed-type input/output control can integrate the IO connection of a plurality of remote ends into an ASIC, thus simplifies wiring and maintenance.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A distributed-type input/output control IC comprising:
   a plurality of local digital IO to control local input/output and control a plurality of digital input/output circuits;
   a plurality of remote IO master to execute command from a bus and transmit data in CRC format to remote end through a single transmission line and transmit data from remote end to the bus in a reversed way;
   wherein said plurality of local digital IO and said plurality of remote IO master are internal circuit of said distributed-type input/output control IC working in master mode, to control a plurality of sets of local and remote input/output circuits.

2. The distributed-type input/output control IC as in claim 1, also comprises
   a bus interface for the interface of data transfer with CPU,
   an interrupt controller for controlling the interrupt vector of the CPU,
   a waiting state generator for setting the waiting time of CPU when accessing the said IC; and
   an address decoder for dealing the address decoding process between the CPU and said IC.

3. The distributed-type input/output control IC as in claim 1, wherein said local digital IO comprises
   a digital input latch to latch the data from the connected digital circuit to the distributed-type input/output control IC
   a digital out latch connected to an output enable to latch the data from said distributed-type input/output control IC to said digital circuit and control said output enable;
   an output enable connected to the output of said digital out latch to enable output signal.

4. The distributed-type input/output control IC as in claim 1, wherein said remote IO master comprises:
   a control unit to control each functional block in the remote IO master,
   an input data CRC checker for checking the CRC error of the input data,
   a shift register connected to the input data CRC checker to register the remote data,
   an output data CRC generator connected to the shift register to generate error detection information for the output data by the remote IO master.

5. The distributed-type input/output control IC as in claim 1, wherein said remote IO master comprises:
   an output latch to latch the plurality of data sent from the distributed-type inpu/output IC and to the remote end,
   a multiplexer connected to the output of the output latch to multiplex three data as one set of data and to transmit the data to a shift register,
   a de-multiplexer connected to the shift register to de multiplex the data sent to the distributed-type input/output IC into three sets of data,
   an input latch to latch the data to be sent to the distributed-type input/output IC.

6. The distributed-type input/output control IC as in claim 1, further comprises a slave operation mode, and the internal circuits for the slave mode comprising
   a control unit to control other members of the distributed-type input/output control IC in slave mode,
   an input buffer to buff the data to be sent to the slave mode distributed-type input/output control IC, a shift register connected to the input buffer for registering data,
   an input data CRC checker connected to the shift register and used to check the CRC error for the input data,
   an output latch to latch the output data of the slave mode distributedtype input/output control IC, and
   an output data CRC generator to generate error detection informnation for the output data by the slave mode distributed-type input/output control IC.

\* \* \* \* \*